United States Patent [19]

Yamakawa

[11] Patent Number: 5,173,810
[45] Date of Patent: Dec. 22, 1992

[54] LIGHT TRANSMITTING LENS FOR USE WITH A PHOTOELECTRIC SENSOR

[75] Inventor: Masami Yamakawa, Tokyo, Japan
[73] Assignee: Aisens Co., Ltd., Japan
[21] Appl. No.: 748,318
[22] Filed: Aug. 21, 1991
[51] Int. Cl.⁵ ............................................... H01J 3/14
[52] U.S. Cl. .................................. 359/819; 359/731; 359/859; 359/852; 362/157; 250/216
[58] Field of Search ............... 359/819, 820, 804, 805, 359/808, 809, 811, 731, 852, 859; 362/157; 250/216

[56] References Cited

U.S. PATENT DOCUMENTS

| | | | |
|---|---|---|---|
| 2,942,102 | 6/1960 | Stoutenburgh | 362/157 |
| 3,124,306 | 3/1964 | Schotz | 362/157 |
| 3,299,262 | 1/1967 | Duncan | 362/157 |
| 3,739,167 | 6/1973 | Avery | 362/157 |
| 4,777,582 | 10/1988 | Sharrah | 362/157 |
| 4,792,685 | 12/1988 | Yamakawa | 359/859 |
| 4,880,974 | 11/1989 | Yamakawa | 359/731 |
| 4,967,069 | 10/1990 | Yamkawa | 359/859 |
| 4,978,843 | 12/1990 | Yamakawa | 359/731 |
| 5,062,899 | 11/1991 | Kruer | 359/859 |

*Primary Examiner*—Carolyn E. Fields
*Assistant Examiner*—Drew A. Dunn
*Attorney, Agent, or Firm*—Barry R. Lipsitz

[57] ABSTRACT

The present invention is directed to a light transmitting lens for transmitting substantially all of the light emitted by a light source, such as a light emitting diode. The light transmitting lens includes a light transmitting structure having an outer surface disposed between first and second sides. Located on the first side is a tubular concave surface, preferably terminated by a hemispherical convex lens. Located on the second side is an opening, preferably a spherical surface. Located within the opening, preferably at the center of the spherical surface, is the light source, preferably a light emitting diode. Some of the light emitted by the light source is captured by the convex lens and transmitted thereby. The light emitted by the light source but not captured by the convex lens is reflected off the outer surface of the structure and thereby transmitted. The outer surface of the light transmitting structure is preferably a substantially conical section having either a substantially parabolic or elliptical shape. The light transmitting lens of the present invention transmits at least three times more light emitted by the light source than the conventional convex lens arrangement of the prior art, thereby producing a given amount of illumination a farther distance, relative to the conventional convex lens arrangement.

12 Claims, 5 Drawing Sheets

(PRIOR ART)

LIGHT TRANSMITTING LENS FOR USE WITH A PHOTOELECTRIC SENSOR

BACKGROUND OF THE INVENTION

1. Technical Field

The present invention is directed to a light transmitting device. More particularly, the present invention is directed to a light transmitting lens for use with a photoelectric sensor.

2. Background Information

A photoelectric sensor enables non-contact detection of objects and/or persons. Thus, photoelectric sensors have found particular utility in the detection of objects conveyed along a conveyor belt in various automated processes, as well as the detection of persons approaching an automatic door.

Turning to FIG. 9, a sectional view of a conventional photoelectric sensor transmitter is illustrated. Convex lens A transmits light emitted from photoelectric element 51, which is preferably located at the focal point of the lens. Photoelectric element 51 is attached to wiring substrate 22, along with various other electronic components 23 which comprise the circuitry for the photoelectric sensor's operation. Motion indicating lamp 24 is connected to wiring substrate 22 via wire C. The convex lens is disposed on the front side of casing B and the bottom of wiring substate 22 is protected by rear panel 31. The photoelectric sensor transmitter is mountable on a wall via brackets (not shown).

In recent years, as photoelectric sensors came into use in various applications, the detection length, defined herein as the distance at which a photoelectric sensor is able to sense an object, has increased. A typical detection length for a direct-reflection type photoelectric sensor is about 3 meters, about 8 meters for a mirror-polarizing-reflection type, and about 20 meters for a transmission type photoelectric sensor.

The prior art has achieved an increase in detection length by increasing the amplification rate of the amplifier in the photoelectric sensor's circuitry, thereby increasing the sensitivity of the photoelectric sensor. However, as the sensitivity increases, so does the potential for degradation of the sensor's accuracy due to external noise interference, e.g., electromagnetic radiating energy.

The prior art has also achieved an increase in detection length by increasing the amount of light which is transmitted by employing a larger convex lens. However, with an increased lens size, the overall dimensions of the photoelectric sensor transmitter is also increased. This can be problematic where space requirements are severe.

The prior art has further achieved an increase in detection length by increasing the amount of light which is output from the photoelectric element. This method increases the signal-to-noise ratio of the device and is therefore typically the preferred approach.

The prior art has attempted to increase the amount of light output from the photoelectric element by, e.g., employing a larger light emitting element, and increasing the current to, and therefore the output from, the light emitting element. These approaches, however, have their drawbacks, including higher cost, size requirements and reduced life cycles.

SUMMARY OF THE INVENTION

Accordingly, it is an object of the present invention to increase the amount of light output from a photoelectric element, and to do so without the disadvantages of the prior art.

In accordance with these and other objects, the present invention is directed to a light transmitting lens for transmitting substantially all of the light emitted by a light source, such as a light emitting diode.

The light transmitting lens includes a light transmitting structure having an outer surface disposed between first and second sides. Located on the first side of the structure is a tubular concave surface, preferably terminated by a hemispherical convex lens. Located on the second side of the structure is an opening, preferably a spherical surface. Located within the opening, preferably at the center of the spherical surface, is the light source, preferably a light emitting didoe.

Some of the light emitted by the light emitting diode is captured by the hemispherical convex lens and thereby transmitted through the light transmitting lens. The light emitted by the light emitting diode but not captured by the convex lens is reflected off the outer surface of the structure and thereby transmitted through the light transmitting lens.

The outer surface of the light transmitting structure is preferably a substantially conical section having either a substantially parabolic or elliptical shape. Further, the center of the spherical surface preferably corresponds to the longitudinal axis of the outer surface of the light transmitting lens.

As discussed in more detail hereinbelow, the light transmitting lens of the present invention transmits about three times more light emitted by the light source than does the conventional convex lens arrangement of the prior art, thereby producing a given amount of illumination a farther distance, relative to the conventional convex lens arrangement.

DESCRIPTION OF THE PREFERRED EMBODIMENT(S)

Figure 1:
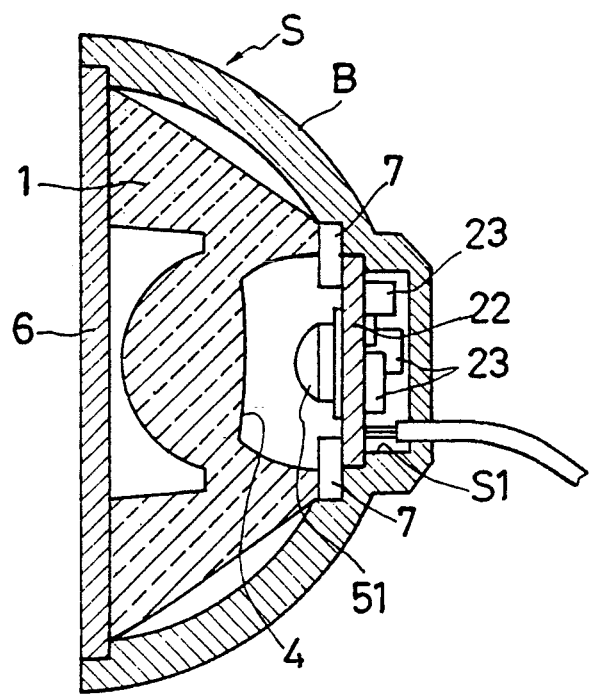
FIG. 1 is a cut-away view of a preferred embodiment of the light transmitting lens of the present invention.

Turning now to FIG. 1, a preferred embodiment of the photoelectric sensor of the present invention is illustrated. Photoelectric sensor S comprises light transmitting lens 1 disposed in casing B via panel 6 and spacers 7. In the preferred embodiment, the interior surface of casing B is hemispherical, casing B is black plastic, and panel 6 is transparent.

Light emitting diode 51 is disposed on wiring substrate 22, preferably in the center of space 4. Various other electronic components 23 which comprise the circuitry for the photoelectric sensor's operation are also disposed on wiring substrate 22, preferably in the center of space S1.

Figures 2A, 2B, 2C:
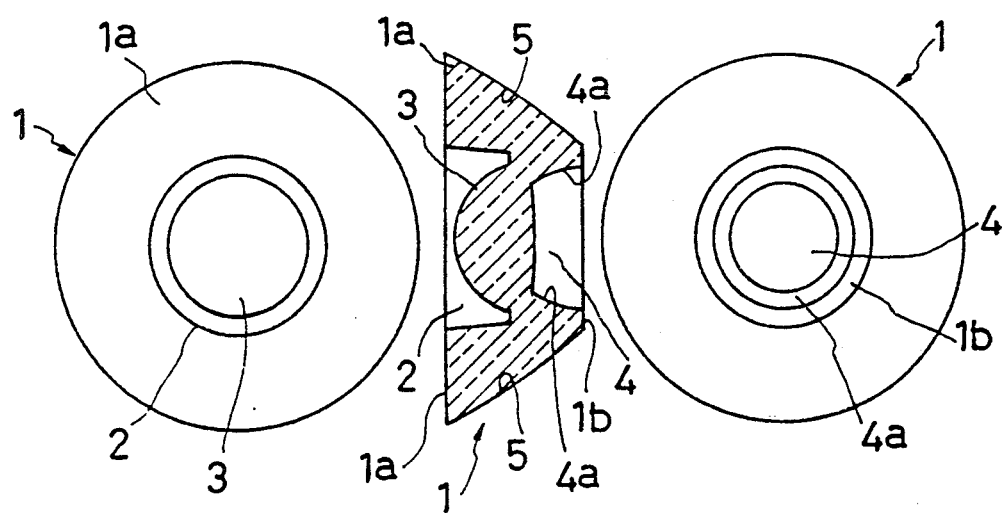
FIGS. 2a, 2b and 2c illustrates different views of the light transmitting lens of FIG. 1.

As shown in FIG. 2(b), a preferred embodiment of the light transmitting lens of the present invention is illustrated. Light transmitting lens 1 preferably is structured such that outer surface 5 is a conical section having a parabolic shape. Alternatively, outer surface 5 can be a conical section having an elliptical shape.

Light transmitting lens 1 preferably includes hemispherical convex lens 3 disposed in tubular concave surface 2. Light transmitting lens 1 preferably also includes space 4 defined from spherical surface 4a, the center of which preferably corresponds to the location of light emitting diode 51 (FIG. 1). In the preferred embodiment, the centers of convex lens 3 and space 4 are aligned with each other along the longitudinal axis of the conical section defining surface 5. Light transmitting lens 1 is preferably made of transparent plastic material, e.g., acrylic resin, unifying the various parts. As explained in more detail below, the light emitting diode, located in the center of space 4, emits light rays into convex lens 3 and off surface 5.

FIG. 2(a) illustrates the light transmitting lens of FIG. 2(b) as viewed facing base 1a. FIG. 2(c) illustrates the light transmitting lens of FIG. 2(b) as viewed facing base 1b.

Figure 3:
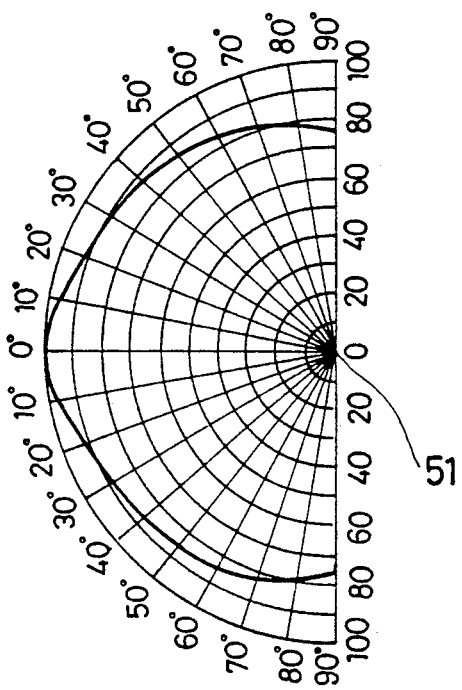
FIG. 3 illustrates the amount of light output from a typical light emitting diode for various directions.

Turning now to FIG. 3, the amount of light output from a typical light emitting diode is illustrated. As shown in FIG. 3, a typical light emitting diode emits light in a sphere of 180°, although the amount of light emitted changes as a function of angular position.

Figure 4:
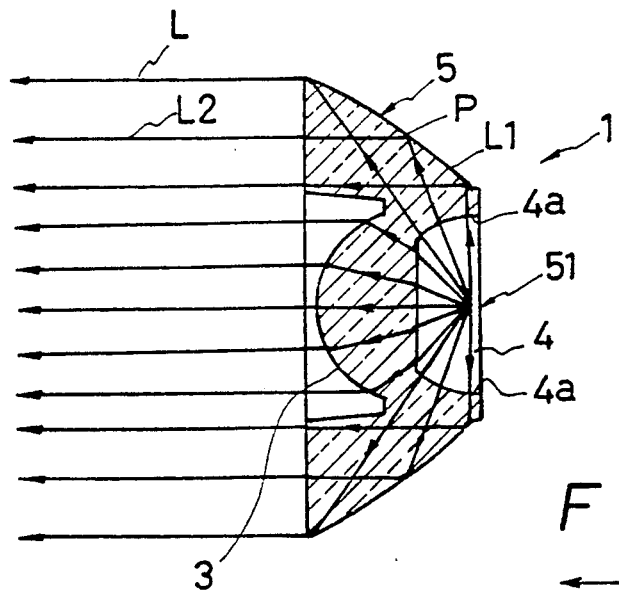
FIG. 4 depicts the pattern of light rays output from the light transmitting lens of FIG. 1.

As shown in FIG. 4, light emitting diode 51 is disposed in the center of space 4 and light rays L are output therefrom. The light rays become parallel to the central axis of the convex lens either after passing therethrough or after reflecting off of surface 5.

In the preferred embodiment, surface 5 is not coated with any reflective material, such as a mirror surface; a reflective surface is not necessary. The angle of incidence of light ray L2 at point P (FIG. 4) is larger than the critical angle at point P, the critical angle being the angle of incidence when light rays totally reflect off of the surface without any light absorption at the interface. In the present invention, the angle of incidence on the interface between air and acrylic (the preferred material of light transmitting lens 1) is about 43°. Thus, light rays reflect off of surface 5 without passing therethrough, and head towards, e.g., a photoelectric sensor (not shown). Accordingly, all light reaching surface 5 gets reflected away therefrom.

Figure 5:
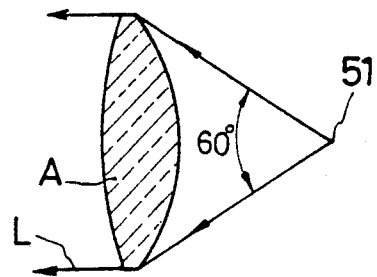
FIG. 5 depicts the pattern of light rays output from a conventional convex lens.

With reference to FIG. 5, given a conventional convex lens (25 mm diameter and a 20 mm focal length), the focusing angle is about 60°. Thus, of the 180° worth of light emitted from a light emitting diode, only about 60° worth is captured and transmitted by a conventional convex lens.

On the other hand, with reference to FIG. 4, the entire 180° worth of light emitted from the light emitting diode is transmitted by the light transmitting lens of the present invention, versus just 60° transmitted by a conventional convex lens. Accordingly, the amount of light which the lens of the present invention is capable of transmitting is at least three times that of the conventional convex lens.

Figure 6A:
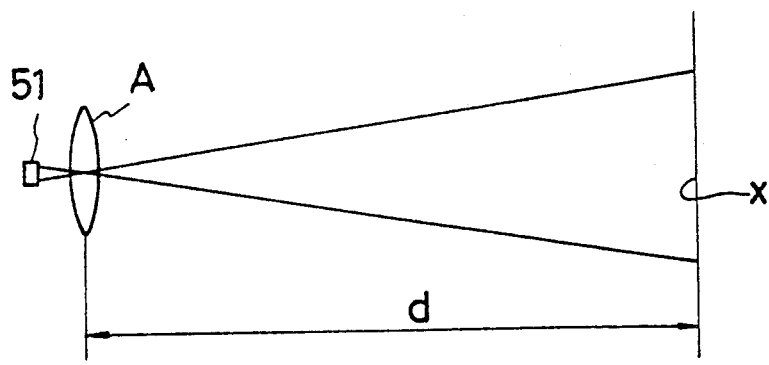
FIGS. 6a and 6b illustrates a comparison between the amount of light transmitted from a conventional convex lens (FIG. 6a) and the amount of light transmitted from the light transmitting lens of FIG. 1 (FIG. 6b).
Figure 6B:
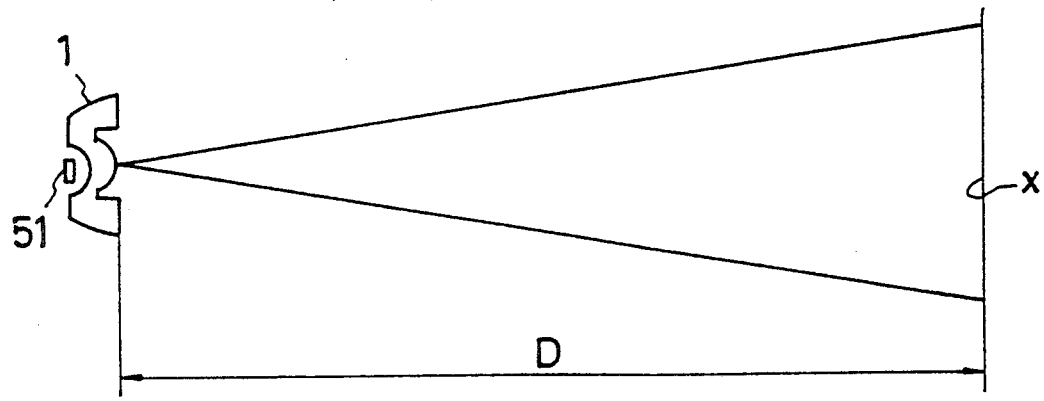

Turning now to FIG. 6, a comparison between the amount of light transmitted from a conventional convex lens (FIG. 6a) and the amount of light transmitted from the light transmitting lens of the present invention (FIG. 6b) is illustrated.

The general relationship between light output Y from a light source and illumination X at a distance L from the lens can be expressed as follows (Equation 1):

$$Y = kL^2 X$$

where k is a fixed number.

Given conventional lens A, as shown in FIG. 6a, where y is the light output from light emitting diode 51, x is the illumination at distance d from lens A, the general relationship can be expressed as follows (Equation 2):

$$x = \frac{y}{kd^2}$$

Given light transmitting lens 1, as shown in FIG. 6b, where 3y is the light output from light emitting diode 51, x is the illumination at distance D from lens 1, the general relationship can be expressed as follows (Equation 3):

$$x = \frac{3y}{kD^2}$$

By setting Equations 2 and 3 equal to each other, the following relationship is obtained (Equation 4):

$$D = \sqrt{3}\, d$$

Thus, the light transmitting lens of the present invention transmits a given amount of illumination a farther distance, relative to the conventional convex lens.

Figure 7A:
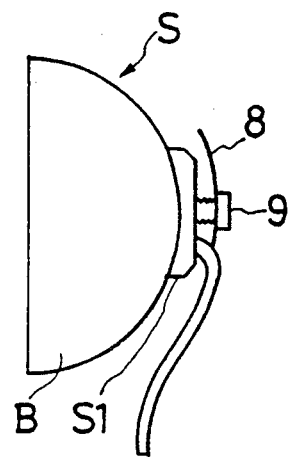
FIGS. 7a and 7b is a schematic view of a holder for securing the light transmitting lens of FIG. 1 against a surface.
Figure 7B:
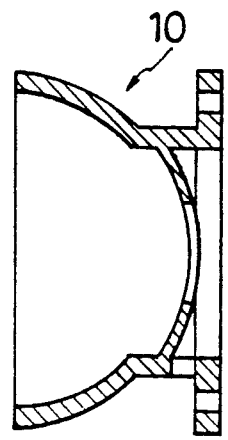

Turning now to FIG. 7, a schematic view of a holder for securing the light transmitting device of the present invention to a surface is illustrated. In the preferred embodiment, spring washer 8 is fixed to the back of sensor S by screw 9 attached to casing B. The assembly of FIG. 7a is preferably placed in holder 10 (FIG. 7b) prior to attaching washer 8 and screw 9.

Figure 8A:
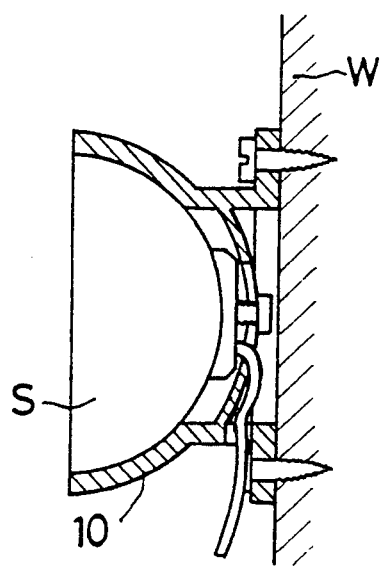
FIGS. 8a and 8b illustrates the holder of FIG. 7b secured to a vertical surface.
Figure 8B:
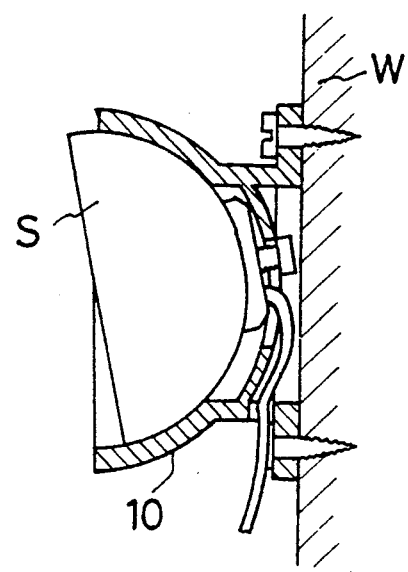
Figure 9:
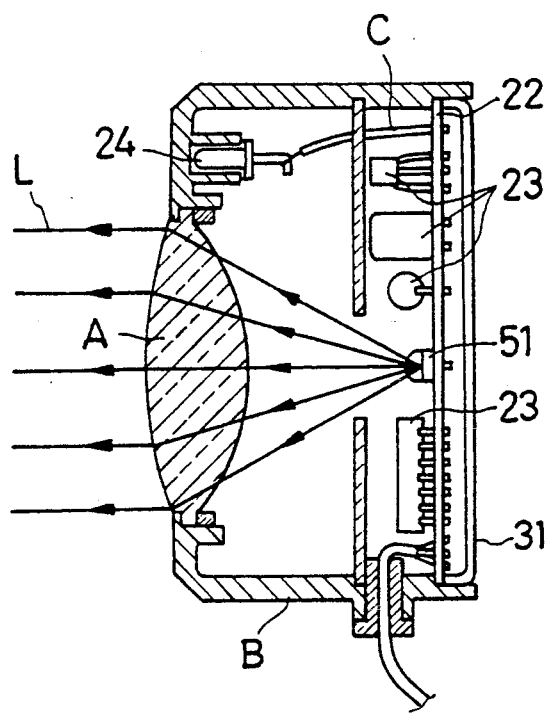
FIG. 9 illustrates a sectional view of a conventional photoelectric sensor transmitter.

The fixed position of the sensor within holder 10 is adjustable via spring washer 8 and screw 9, as shown in FIGS. 8a and 8b. Holder 10 can be attached to a surface such as wall W via screws. Given the flexibility of positioning the sensor within the holder, it should allow the sensor to be easily adjusted towards its intended target.

The light transmitting lens of the present invention has several advantages over the conventional convex lens employed by the prior art. For example, the light transmitting lens of the present invention transmits substantially all of the 180° worth of light emitted from the light source, versus only about 60° worth transmitted by a conventional lens. Thus, it is both thinner and circumferentially smaller than the size of a convex lens required for the same illumination distance. Additionally, it is not necessary to place a reflective material on surface 5, given the geometry of the light transmitting lens of the present invention. Thus, costs are kept to a minimum. Further, given the configuration of the light transmitting lens and its holder, it should be easy to adjust the position of the sensor towards its intended target, e.g., a light-receiving device.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What is claimed is:

1. A light transmitting device comprising:
   a light transmitting structure having an outer surface disposed between a first and a second side;
   a tubular concave surface disposed in the first side of said light transmitting structure;
   a hemispherical convex lens disposed in said tubular concave surface;
   an opening in the second side of said light transmitting structure; and
   a light source located within said opening, said light source capable of emitting light, whereby light emitted by said light source is captured by the hemispherical convex lens and transmitted therefrom, as well as reflected off said outer surface of said structure and thereby transmitted.

2. The light transmitting device of claim 1, wherein said outer surface of said light transmitting structure is a substantially conical section having a substantially parabolic shape.

3. The light transmitting device of claim 1, wherein said outer surface of said light transmitting structure is a substantially conical section having a substantially elliptical shape.

4. The light transmitting device of claim 1, wherein said opening is a spherical surface.

5. The light transmitting device of claim 4, wherein the center of said spherical surface corresponds to the longitudinal axis of said outer surface of said light transmitting structure.

6. A light transmitting lens comprising:
   a light transmitting structure having an outer surface disposed between a first and a second side;
   a tubular concave surface disposed in the first side of said light transmitting structure;
   a convex lens disposed in said tubular concave surface; and
   an opening in the second side of said light transmitting structure;
   wherein said convex lens and outer surface share a common focal point within said opening, whereby light emitted at said focal point is captured by the convex lens and transmitted therefrom, as well as reflected off said outer surface of said structure and thereby transmitted.

7. The light transmitting lens of claim 6, wherein said outer surface of said light transmitting structure is a substantially conical section having a substantially parabolic shape.

8. The light transmitting lens of claim 6, wherein said outer surface of said light transmitting structure is a substantially conical section having a substantially elliptical shape.

9. The light transmitting lens of claim 6, wherein said opening is a spherical surface.

10. The light transmitting lens of claim 9, wherein the center of said spherical surface corresponds to the longitudinal axis of said outer surface of said light transmitting structure.

11. The light transmitting lens of claim 6 wherein said light transmitting structure is made from a transparent material configured to reflect light off of said outer surface without a reflective coating.

12. The light transmitting lens of claim 6 wherein said lens is structured to capture and transmit light emitted by a light source at said focal point over an angle of substantially 180°.

* * * * *